United States Patent [19]

Johanson et al.

[11] Patent Number: 5,195,264
[45] Date of Patent: Mar. 23, 1993

[54] DISTRESS STOP WARNING INFORMATION SIGN FOR VEHICLES

[76] Inventors: Lars-Gunnar Johanson, 28 Rue St. Joseph, F-83680 LaGarde Freinet, France; Daniel Miles, 308 Murray St., Santa Cruz, Calif. 95062

[21] Appl. No.: 689,761

[22] PCT Filed: Dec. 12, 1989

[86] PCT No.: PCT/SE89/00724
  § 371 Date: May 31, 1991
  § 102(e) Date: May 31, 1991

[87] PCT Pub. No.: WO90/06865
  PCT Pub. Date: Jun. 28, 1990

[30] Foreign Application Priority Data

Dec. 13, 1988 [SE] Sweden .................. 8804501

[51] Int. Cl.$^5$ ............................. G09F 21/04
[52] U.S. Cl. ........................ 40/591; 40/903; 248/911
[58] Field of Search ............... 40/591, 583, 617, 903, 40/582; 116/173; 248/911, 229, 215, 211; 24/706.4, 707.6, 707.7

[56] References Cited

U.S. PATENT DOCUMENTS

| 782,738 | 2/1905 | Faust | 248/215 |
| 2,157,001 | 5/1939 | Morley | 248/215 X |
| 2,431,108 | 11/1947 | Carleton et al. | 40/591 |
| 2,546,855 | 3/1951 | Frame | 40/591 X |
| 2,641,965 | 6/1953 | Valenza | 248/215 X |
| 3,672,323 | 6/1972 | Hawes | 40/591 X |
| 3,715,821 | 2/1973 | Hawes | 40/591 |
| 4,397,438 | 8/1983 | Chapman | 248/229 |

Primary Examiner—Kenneth J. Dorner
Assistant Examiner—Milton Nelson, Jr.
Attorney, Agent, or Firm—Nilles & Nilles

[57] ABSTRACT

A warning and information sign comprising a warning triangle and an information sign carrier and having at one corner thereof a hanger hook enabling a mounting of the sign over the upper edge of any desired side window of the car, and which hanger hook is formed as a double hook comprising two U-shaped hook loops arranged with the openings thereof facing each other and which loops are integral over a web portion which is bent in an angle rearwardly from the openings of said loops such that the lower hook loop, which is not used as a hanger for the moment, is free from the side window of the car or provides a support thereagainst when the sign is hung by the opposite hook loop.

14 Claims, 4 Drawing Sheets

DISTRESS STOP WARNING INFORMATION SIGN FOR VEHICLES

SUMMARY OF THE INVENTION

The present invention generally relates to a warning and information sign for motor vehicles useful in case of distress stop and the invention is more particularly directed to a sign of this type which displays a long distance information in the form of a warning triangle and a short distance information in the form of information symbols advising of the reason why the warning triangle has been put up, for instance information about some type of assistance which is wanted, or information that no assistance is needed or has already be requested.

Warning signs or warning triangles for motor vehicles are known, which are adapted to stand on the ground and to be placed on a relatively long distance from the vehicle, generally 50–100 meters behind and/or in front of the vehicle which has stopped on the road because of motor stop, tire puncture, or for any other reason. Such warning signs have to be placed on the ground adjacent the right half of the road (at right hand traffic) thereby warning the passing road-users that a vehicle has stopped a distance further on.

In cases of good visibility, at straight and lever roads and at little traffic, these warning triangles standing on the ground generally fulfill their purpose of warning the following road users of the vehicle standing some distance further on. However, there are many situations when the warning triangle has only a poor, if even any, effect, or when the warning triangle can not be placed on the road, for instance if the driver of the actual vehicle is handicapped or cannot move freely, or when the triangle cannot be placed on the road without the risk that the person handling the triangle is knocked down, for instance on highly travelled roads or main roads, or on multilane motor traffic roads, or when the vehicle happens to stop on the middle lane or the left lane (at right hand traffic).

It may on a hilly and curvy road be difficult to observe a triangle which is standing on the road adjacent the roadside, and in this situation it may be still more difficult to observe the vehicle standing 50–100 meters from the warning triangle. This is also the case during bad weather like in rain, snow or mist, whereby the triangle may also be splashed all over by dirt or may be hidden by snow drifting because of passing vehicles, so that the triangle cannot be observed by the passing vehicles. In case of heavy traffic it may besides be difficult even during good weather to observe the triangle standing on the road since the motor cars ahead obstruct the visibility thereof. It also may happen that the triangle is run into, or that it blows over, for instance depending on the speed of wind appearing following passing vehicles.

In some countries the responsible authorities also recommend that the vehicle drivers, in particular women, should not leave the vehicle in case of vehicle stop, depending on the risk of robbery etc.

Further, these signs standing on the road do not give any information of the reason why the vehicle has stopped or that assistance is wanted, or what type of assistance is wanted.

Still further, the warning triangle placed as mentioned above cannot be observed by the meeting road-users, and this can cause troublesome situations, especially on narrow one-lane roads.

Other types of warning signs solve some of the above mentioned problems, for instance warning signs which can be mounted on the vehicles. Some known warning signs are formed for being hung over the upper edge of a side window, which window is raised after the sign has been hung thereon. Examples thereon are disclosed for instance in the U.S. Pat. Nos. 3,024,552, 3,703,152, 3,762,360 and 3,840,285.

All of these known apparatus, however, are disadvantageous in that they are designed for being mounted only on a special side of the vehicle, in the illustrated cases on the left side. Therefore, they cannot be used on vehicles driving at left hand traffic, whereby the warning triangle has to be mounted on the right side of the vehicle, at least not without rearranging the mounting means thereof, since the warning sign has a first side intended to face rearwardly and second side intended to face forwardly. Also they cannot be used in case the car has happened to stop in the left lane or the middle lane of a multilane road, or on occasions when a sign should preferably be mounted on each side of the vehicle. Most of these known signs also are designed so as not to indicate the reason why the vehicle has stopped or is case assistance that is wanted.

SUMMARY OF THE INVENTION

Therefore the object of the invention is to solve the problem of providing a warning and information sign for vehicles, which sign can be hung over a side window on any side of a vehicle and without being reassembled or without making any special arrangements, can be put up without the need for anyone to leave the vehicle, is formed so that it can be clearly seen from a great distance both from behind and from in front of the vehicle, is also designed so that it is easy to mark the reason for the stop and the assistance which may be wanted, and which marking is clearly seen from a relatively close distance, is made of an elastically yieldable material having a sufficient resistance for withstanding the forces which can be applied to the sign depending on the speed of wind from passing vehicles, etc., and is designed so that it can easily be collapsed to a little pack which can be kept lying in the car, for instance in the side pocket of the car door or in the glove compartment of the car (however never in the trunk of the car).

Thus, the invention relates to a warning and information sign useful during distress stop situations and adapted for being hung over a side window of a vehicle, optionally at the left and/or the right side of the vehicle, and without the need for any person to leave the vehicle, and which sign preferably sticks up some distance above the roof of the car and which, as prescribed, has a triangle bottom side (base) which quickly and easily and without the use of tools can be adjusted to a horizontal position, and which sign comprises a collapsible triangle have a preferably red or orange colored, retroreflecting "rear side" and a preferably orange colored, fluorescent "front side", and which at one corner thereof is formed with a hanger hook for mounting of the sign over the upper edge of a side window of the car, and which is, as mentioned above, formed so that is can very easily be observed both by passing and meeting road-users, both at night and during the daytime.

According to the invention the hanger is formed as a double hook in the form of two U-shaped hook parts which are facing each other with the openings thereof and which are integral over an intermediate (web) portion which is bent rearwardly over a certain angle from the opening sides of said hook parts, so that the lower hook part, which is not used at the moment, extends freely of, or forms a support in contact with the outer surface of the side window of the car when the sign is mounted by means of the opposite hook part. The triangle is preferably mounted in the hook so that it can, by a slight press by the hand, be adjusted so that the triangle base takes the intended horizontal position, independently of the inclination of the car.

The sign according to the invention is also formed with a turn over leaf block or a similar means, which can be mounted in a carrier under the horizontal base of the triangle, and which includes several internationally easily comprehensible symbols, from which a specific symbol can be chosen and exposed forwardly and rearwardly for indicating the reason for the stop and the assistance wanted.

BRIEF DESCRIPTION OF THE DRAWING

Further characteristics and advantages of the invention will be evident from the following detailed description, in which reference will be made to the accompanying drawings.

In the drawings

DESCRIPTION OF THE PREFERRED EMBODIMENTS

Figure 1:
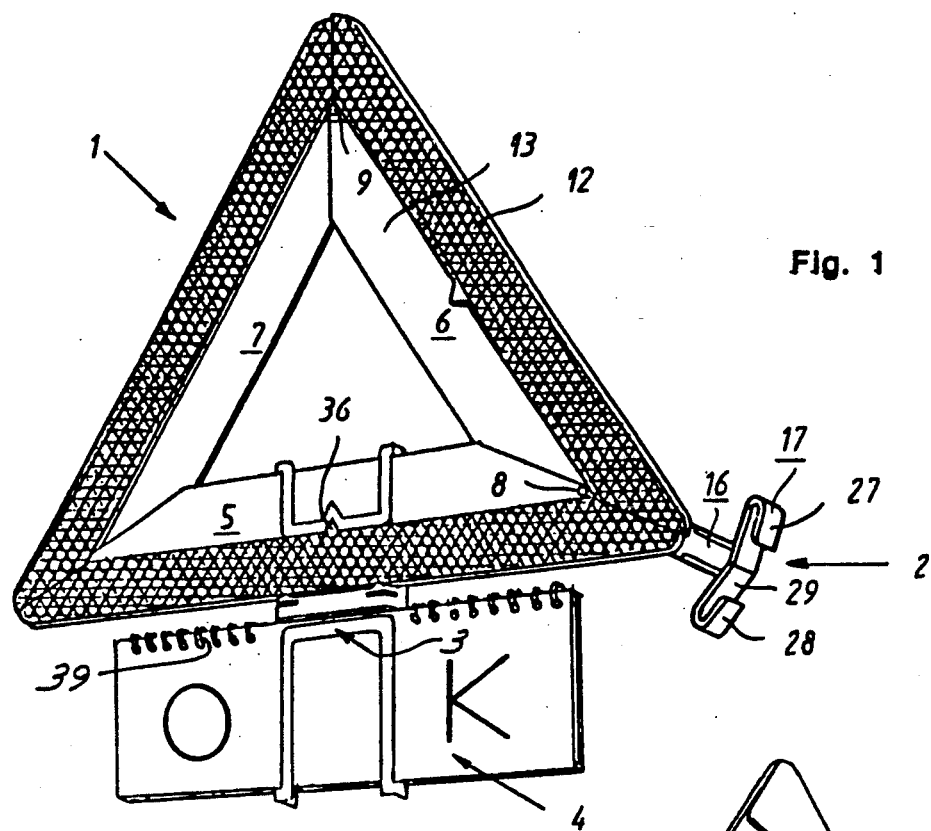
FIG. 1 shows a warning and information sign according to the invention seen from "behind", as apprehended by passing vehicles.
Figure 2:
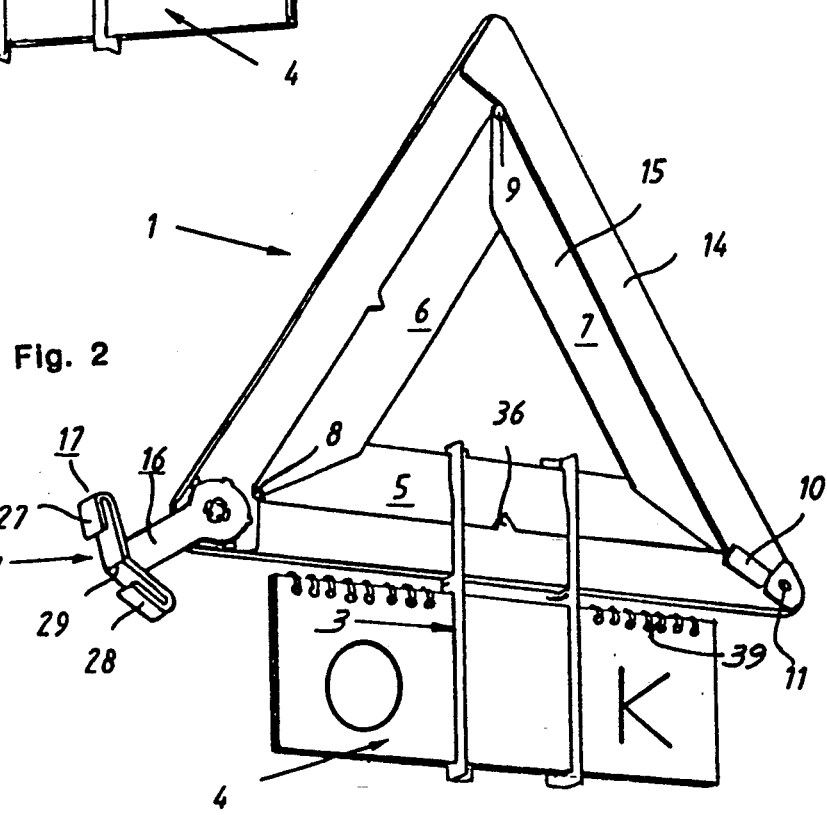
FIG. 2 shows the same sign "from in front", that is such as the sign is apprehended by meeting vehicles.

The apparatus shown in FIGS. 1 and 2 generally comprises a warning triangle 1, a hanger hook 2, a carrier 3 for an information means, and the information means, for instance a fold over leaf block 4 containing for instance information symbols.

Figure 3:
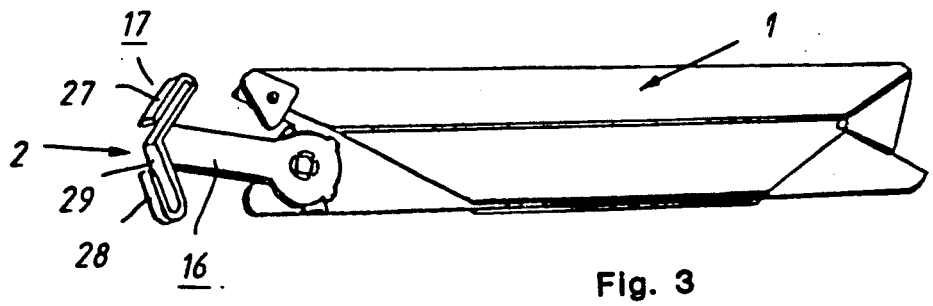
FIG. 3 shows the sign in the collapsed state.
Figure 4:
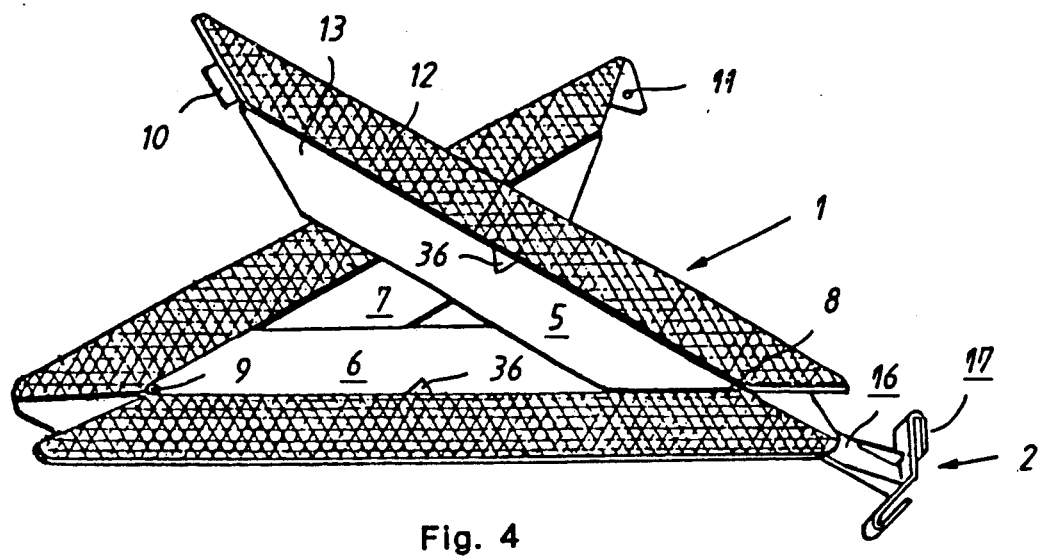
FIG. 4 shows the sign in a position while folding the sign up to triangular form.

In the illustrated case the warning triangle 1 is a collapsible type and comprises three triangle legs 5, 6 and 7, the legs 5 and 6 of which are connected to each other via a hinge 8 and the legs 6 and 7 are connected to each other via another hinge 9, whereas the legs 5 and 7 can be connected to each other by means of an flap coupling 10 and a locking pin 11 extending through the corners of the legs. The triangle is collapsible as shown in FIGS. 3 and 4. From these figures it is evident that the legs 5, 6 and 7 in the collapsed state are positioned in parallel with each other, whereby the triangle appears like a little flat pack. According to the present stipulations by authorities, the triangle is formed with a coating of a certain type on the side to be exposed rearwardly and a coating of another type on the side to be exposed forwardly. In the illustrated case each leg of the triangle has on the "rear side" thereof a outer strip 12 of a red or orange colored retro-reflecting covering and an inner colored strip 13, for instance of an orange colored fluorescent material. On the "front side" the triangle can have an outer and an inner strip 14, 15 of an orange colored fluorescent material. The essential and important point with respect to traffic safety is that it is clear which side is the rear side and which side is the front side.

The method of erecting and collapsing of the triangle is clearly appreciated from FIG. 4.

Figures 6, 7:
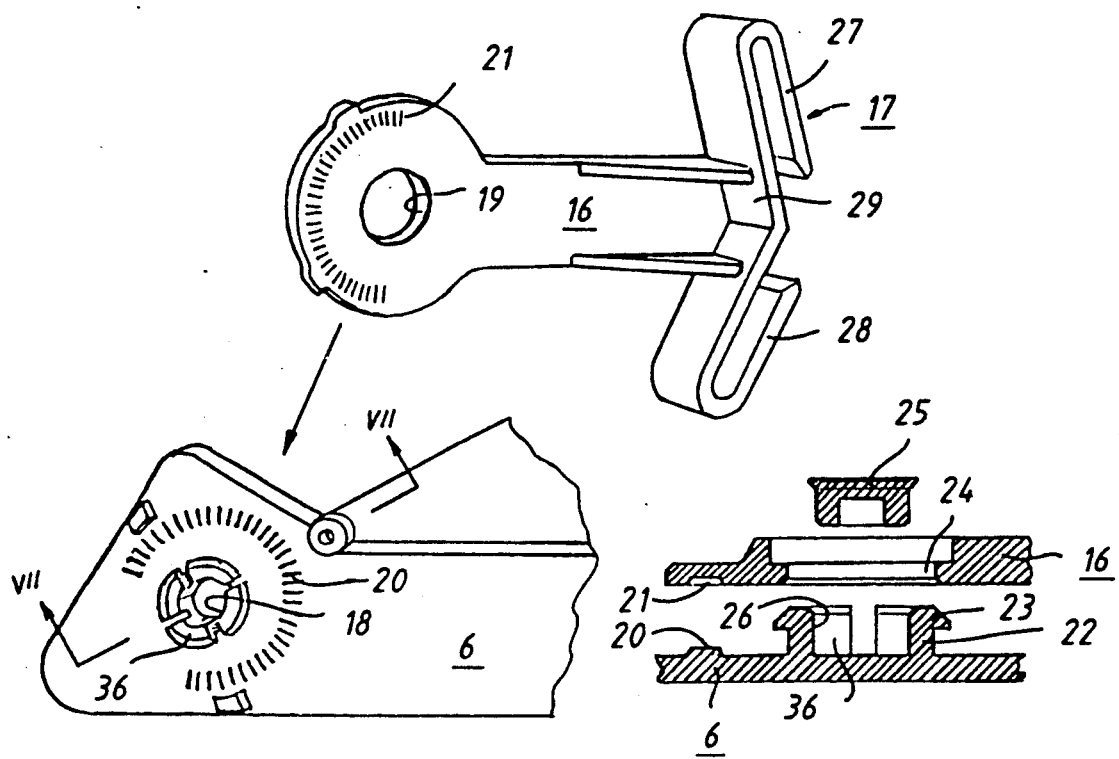
FIG. 6 shows in detail a hook and the corner of the triangle at which the hook is mounted.
FIG. 7 is an exploded sketch of a means for joining the triangle corner and the hook.

The hook 2 is connected at a corner of the triangle leg 6. The hook comprises a carrier arm 16 and a hook means 17 which is specific to the invention. The hook can be connected to the triangle leg in many different ways, for instance by means of a friction joint or a snap joint as shown in FIGS. 6 and 7. In the illustrated case both the leg 6 and the carrier arm 16 are formed with co-operating bores 18 and 19 and co-operating ribs and grooves 20 and 21 for making it possible to adjust the position of the hook arm in relation to the triangle leg in small steps, in particular adjusting the position so that the triangle leg 6 (or the leg 5 depending on which side the sign is mounted on, the left side or the right side) is positioned horizontally when the triangle has been hung over the car window. Round the bore 18 of the triangle leg 6 there is a carrier pin 22 having slots or bores, and over this pin the hook arm 16 can be pressed with the bore 19 thereof. The pin 22 is formed with barbs 23 adapted to engage behind a collar 24 of the bore 19, and for securing the parts in their interconnected position a locking plug 25 can be pressed into the central bore 26 of the carrier pin 22.

Figure 5:
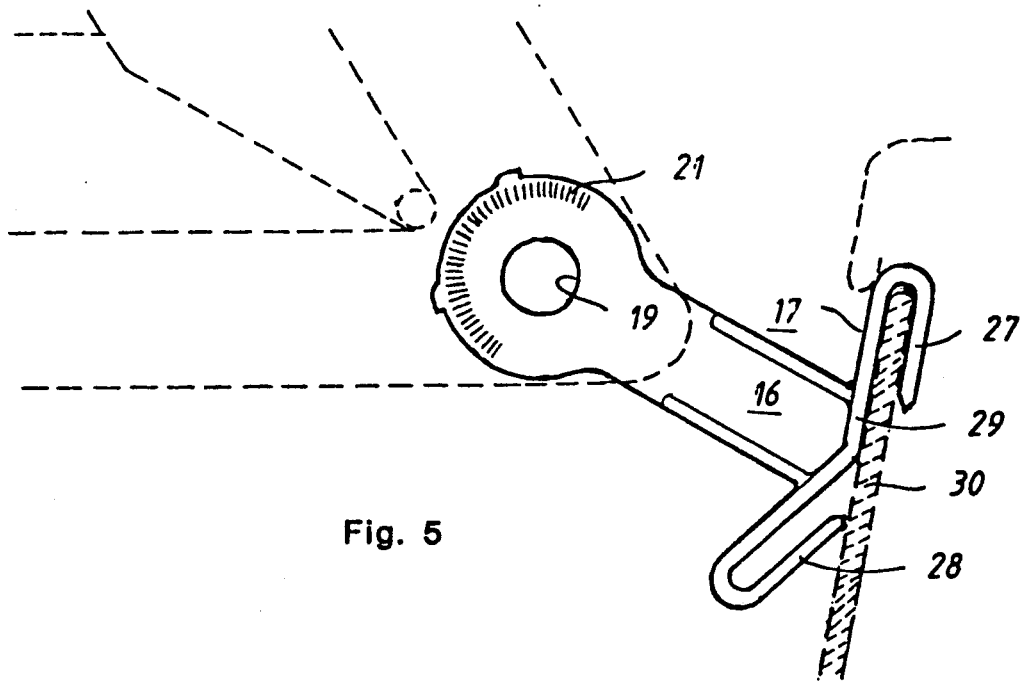
FIG. 5 shows a detail of a sign hanged over a side window of a motor car.

The hook means 17 at the outer end of the carrier arm 16 is formed as a double hook comprising two hook loops 27, 28 the openings of which are facing each other, and which are integral over a web portion 29 which is bent angularly rearwardly from the hook loops 27 and 28 so that the free outer end of each hook loop extends on line with the base plane of the opposite hook loop. By this arrangement, the outer end provides a support which is in contact with the side window of the car when the sign is hanged over said window. This is illustrated in FIG. 5, from which figure it is evident that the outer end of the hook loop 28 engages the outer surface of the side window 30 of the car.

Figure 9:
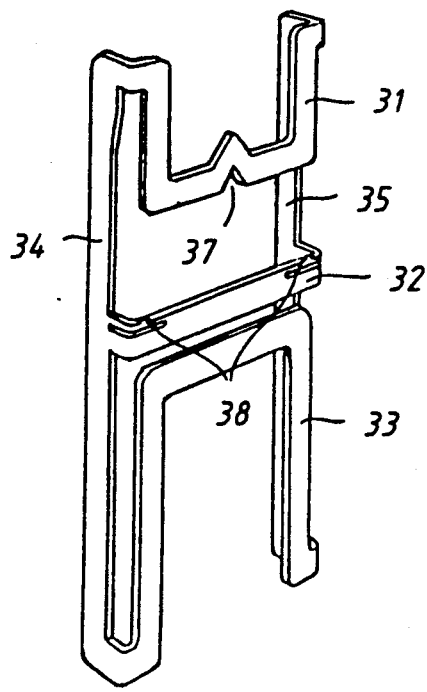
FIGS. 9 and 10 show the holder of the turn over leaf block in two different views.

The carrier 3 for the information means is made of a slightly resilient and preferably transparent material like a polyamide resin. As is most clearly shown in FIGS. 9 and 10, the information carrier 3 comprises a mounting hanger 31 at the upper part, a base portion 32, and a block holder 33 at the lower part thereof. The carrier is formed with two vertical legs 34 and 35 interconnecting the hanger 31, the base portion 32 and the block holder 33. Each of the hanger 31 and the block holder 33 forms an upwardly and downwardly resp. extending U-shaped bracket which is elastic in the connection to the vertical legs 34, 35 so that the hanger 31 can be forced over the triangle leg 5 or 6, whereby the upper side of the base portion 32 locks the carrier in this position, and so that the turn over leaf block 4 can be forced into the holder space formed by the block holder 22 and the bottom side of the base portion 32. For giving the carrier a correct positioning the triangle legs 5 and 6 can be formed with a location pin 36, and the bottom edge of the hanger 31 can be formed with a matching recess 37.

In order to prevent the carrier 3 from becoming released from the triangle base the base portion 32 of the carrier can be formed with a pair of projecting, resilient noses 38 for snap engaging behind the rear side of the triangle base and thereby preventing the carrier from becoming un-intentionally released from the warning triangle, and also for securing the carrier against the wind pressures which appear when vehicles pass from in front or from behind and which are often rather heavy.

Figure 8:
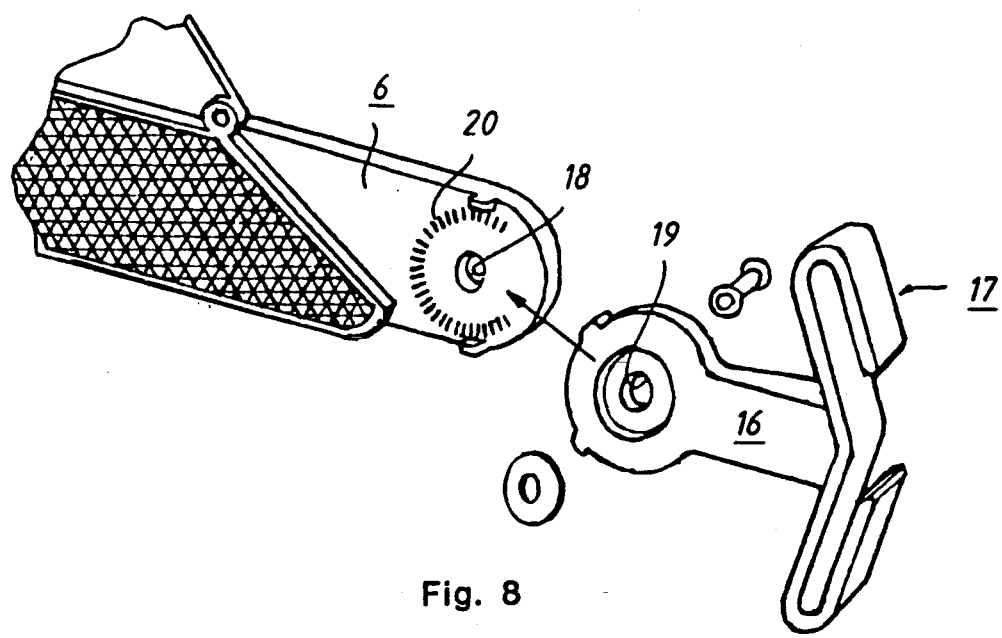
FIG. 8 shows, in the same type of view as in FIG. 6, an alternative embodiment of a hook with the mounting means for the triangle.

As an alternative to the embodiments of the hanger means shown in FIGS. 6 and 8 the carrier arm 16 may be formed with a ball and the leg 6 with a matching ball carrier so that the triangle can be adjusted universally as desired.

In the illustrated case the fold over leaf block is a ring block 4 having two sets of rings 39, one on each side of the carrier 3, whereby the rings 39 secure the block 4 from un-intentionally becoming released from the carrier 3.

When the motor of the vehicle stops, or when the car is stopped for another reason, and other road-users ought to be warned, and assistance is to be requested, the collapsed warning apparatus is picked up from the door pocket or the glove compartment of the car; the triangle 1 is fold up; the carrier 3 is put on its place of the actual triangle base; a suitable symbol is chosen from the fold over leaf block 4, and the block 4 is placed in the carrier 3; one side window 30 (or both side windows if one triangle is to be mounted on each side of the car) is slightly lowered so that the sign can be hanged over the window by means of the hook 2, for instance using the hook loop 27; the sign is adjusted so that the triangle base comes into a horizontal position; the side window 30 (or the side windows) is (are) raised whereby the sign becomes steadily arranged in the intended position, and other road users are warned, both those coming from behind and those coming from in front, and also the reason for the stop or the desired assistance are evident from the information sign 4 appearing below the triangle base.

For warning the passing and meeting road users as quickly as possible, it is preferred to first put up the triangle on the side window and to thereafter mount the carrier 3 and to choose the suitable symbol of the fold over leaf block 4 and to put the block 4 in the holder thereof.

Figure 10:
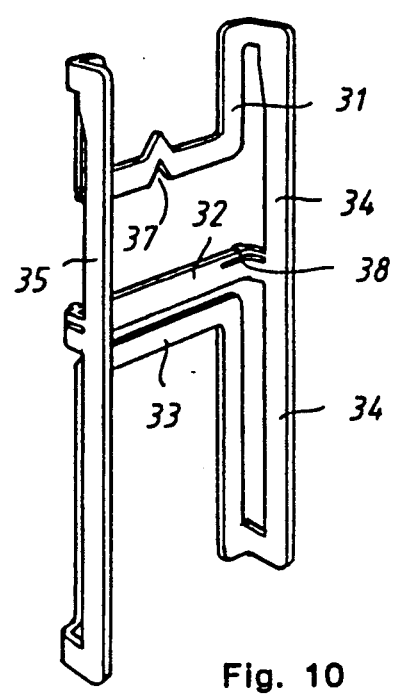
Figure 11:
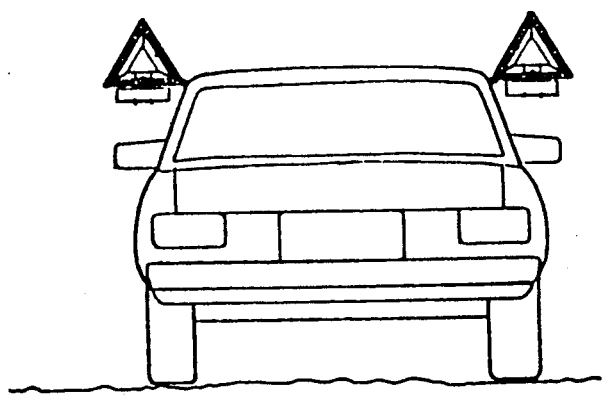
FIG. 11 shows a car having a warning sign on each side thereof and standing on lever ground, and FIG. 12 correspondingly shows a car having two signs and standing with a heavy inclination.
Figure 12:
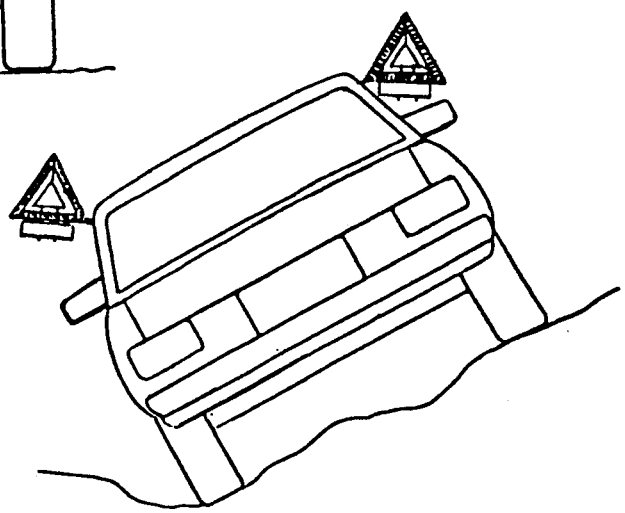

FIGS. 10 and 11 illustrate a car as seen from behind, and in this case a sign has been put up on both sides of the d vehicle. It is obvious that it is in many cases quite sufficient to put up only one sign.

When putting up the sign on the opposite side (the right side) of the vehicle the triangle is tilted one third of a turn in relation to the carrier arm 16, and the hook 2 is hanged over the right side window by means of the second hook loop 28.

When the reason for the stop has been eliminated a symbol of the fold over leaf block 4, for instance the symbol "OK", can be put up, whereby the triangle still acts as a warning and concurrently therewith the information block advices that no assistance is wanted. After finished use the sign is put down oppositely as described above, it is collapsed and is put back into the door pocket or the glove compartment, and is ready for being used on a following occasion.

I claim:

1. A distress-stop warning sign for a motor vehicle having left and right side windows, comprising:
   (A) a collapsible warning triangle having a colored retro-reflecting rear side and a colored fluorescent front side; and
   (B) a hanger hook, connected to said triangle for hanging said triangle on said vehicle such that said triangle extends above said vehicle, said hanger hook being formed as a double hook including a first U-shaped hook loop which has an open side and which is mountable on said left side window, a second U-shaped hook loop which has an open side and which is mountable on said right side window, and a web portion integral with and connecting said first and second hook loops, said web portion being bent at an angle away from said open sides of said hook loops such that, when one of said first and second hook loops is mounted on the respective one of said left and right side windows, the other of said first and second hook loops is free from the respective window.

2. A sign according to claim 1, wherein both said triangle and said hook are made of an elastically resilient material.

3. A sign according to claim 1, wherein, when said one hook loop is mounted on the respective window, said other hook loop is supported on the respective window.

4. A sign according to claim 1, wherein said hook is connected to said triangle via a connector which allows said triangle to be adjusted by hand such that a base of said triangle is horizontal regardless of the inclination of the window on which said triangle is hung.

5. A sign according to claim 4, wherein said connector comprises one of a friction lock joint, a ball joint, and a snap coupling.

6. A sign according to claim 1, further comprising
   a fold over leaf block, and
   a carrier which is mounted on a base of said triangle and which receives said fold over leaf block.

7. A sign according to claim 6, wherein said carrier includes a resilient hanger which is hung on said base of said triangle, said hanger including
   a base portion having locking noses for securing said carrier from being un-intentionally released from said triangle, and
   a block holder portion for mounting said fold over leaf block in said carrier.

8. A distress-stop warning and information sign adapted to be quickly hung over a side window of a motor vehicle, without the need for anyone to leave the vehicle, and for being placed optionally on the left side and the right side of the vehicle and always with a retro-reflecting side of the sign turned rearwardly facing passing road users, and which sign extends some distance above the roof of the vehicle, and which can be adjusted so that a bottom side of the sign extends in the horizontal plane, which sign comprises: a collapsible warning triangle having a colored retro-reflecting "rear side" and a colored fluorescent "front side", and which at one corner of the triangle is formed with a hanger hook enabling a mounting of the sign over the upper edge of any desired side window of the vehicle, wherein the hanger hook is formed as a double hook for alternative hanging of the triangle on the left side and the right side of the vehicle, said double hook including two U-shaped hook loops arranged with openings thereof facing each other, and which loops are integral over a web portion which is bent at an angle rearwardly from the opening sides of said loops such that the lower hook loop which is not used as a hanger for the moment is free from the side window of the vehicle when the sign is hung by means of the opposite hook loop.

9. A sign according to claim 8, wherein both the triangle and the hook are made of an elastically resilient material having a resistance which is sufficient to withstand the forces resulting from the wind caused by passing vehicles.

10. A sign according to claim 8, wherein the double hook is angularly formed such that the lower hook loop which is not used as a hanger for the moment provides a support for the sign against the side window of the vehicle.

11. A sign according to claim 8, wherein the hook is connected to the warning triangle such that the triangle, without the need of using tools, can be adjusted so that a base of the triangle is horizontal irrespective of the inclination of the side window or of the vehicle.

12. A sign according to claim 11, wherein the connection between the hook and the triangle is formed as one of a friction lock joint, a ball joint, and a snap coupling.

13. A sign according to claim 8, further comprising means for conveying information, said information conveying means including a fold over leaf block including at least one internationally easily comprehensible symbol which can be exposed both rearwardly and forwardly, and a carrier on which said fold over leaf block is mounted and which can be mounted on the triangle.

14. A sign according to claim 13, wherein the block carrier is designed with a resilient hanger by means of which the carrier can be hung on a base of the triangle, a base portion of the resilient hanger having locking noses for securing the carrier from being unintentionally released, and a block holder portion of the resilient hanger being capable of mounting the fold over leaf block in the carrier.

* * * * *